March 1, 1927.

A. E. L. CHORLTON 1,619,702

REVERSING GEAR FOR INTERNAL COMBUSTION ENGINE LOCOMOTIVES

Filed Nov. 12, 1924  3 Sheets-Sheet 1

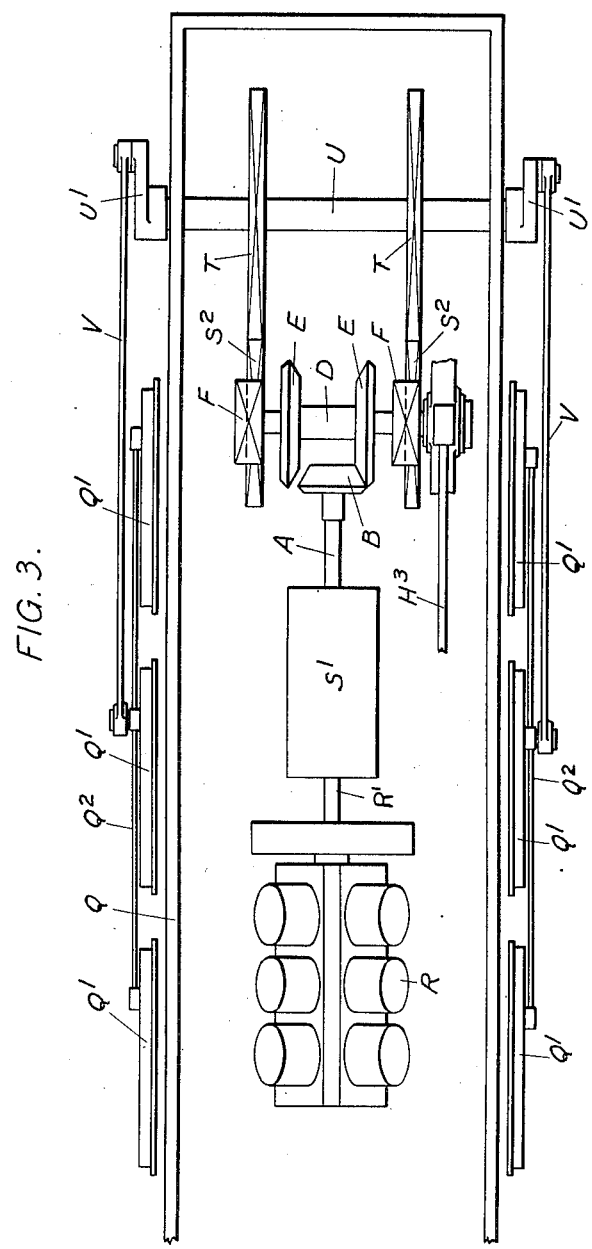

Patented Mar. 1, 1927.

1,619,702

UNITED STATES PATENT OFFICE.

ALAN ERNEST LEOFRIC CHORLTON, OF LONDON, ENGLAND.

REVERSING GEAR FOR INTERNAL-COMBUSTION-ENGINE LOCOMOTIVES.

Application filed November 12, 1924. Serial No. 749,500.

This invention relates to reversing gear and has for its object to provide a construction adapted to withstand the considerable strains and stresses that arise in the driving mechanism of a rail locomotive propelled by an internal combustion engine.

In a reversing gear employed for this purpose it is essential that the structure should be of a simple nature designed so as to provide the maximum strength in all parts through which the drive is transmitted in view of the considerable horse power of the internal combustion engine that must be employed as the prime mover. Thus for example it is not practicable to have gear wheels sliding on a shaft to which these wheels are connected by feathers and keyways, but any rotating wheels must be rigidly fixed on their shafts.

According to the present invention a bevel drive is employed for the reversing gear and comprises a pinion fixed on the driving shaft and two bevel wheels rigidly mounted on a shaft disposed at right angles to the driving shaft these bevel wheels being adapted to engage alternatively with the bevel pinion. The shaft carrying these bevel wheels is mounted so that it can slide as a whole in its bearings carrying with it the bevel wheels and thereby bringing one or the other of these wheels into engagement with the driving pinion. The gear wheels through which the drive is transmitted from the shaft which carries the bevel wheels are constructed and arranged so as to permit of this sliding of the shaft while maintaining the gear wheels in engagement.

The accompanying drawings illustrate by way of example two alternative constructions that may be adopted in carrying the invention into practice. In these drawings, Figure 1 is a sectional elevation of one construction of the improved reversing gear showing part of the mechanism by means of which the shaft carrying the bevel wheels can be caused to slide.

Figure 3 is a diagrammatic plan illustrating how the reversing mechanism may be disposed in the frame of a locomotive and illustrating the manner in which the drive may be transmitted from an internal combustion engine to the road wheels.

Figure 1:
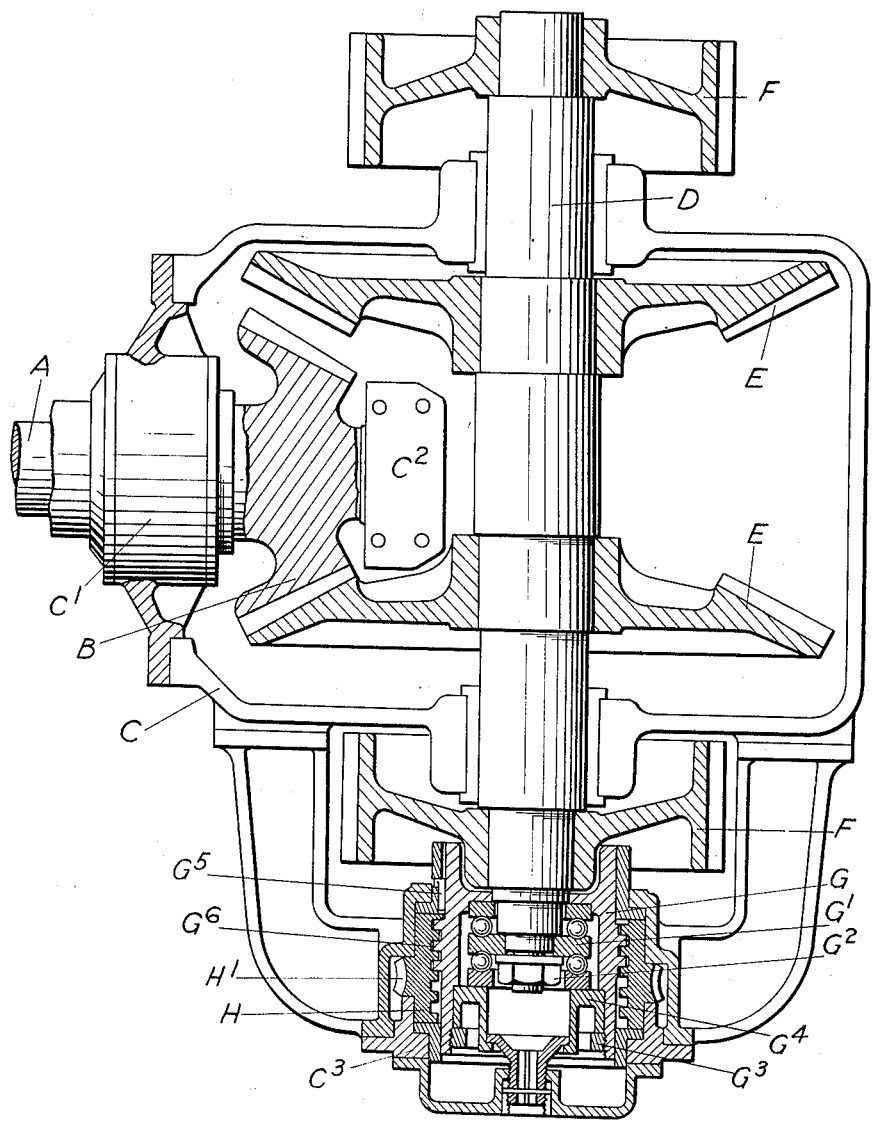
Figure 2:
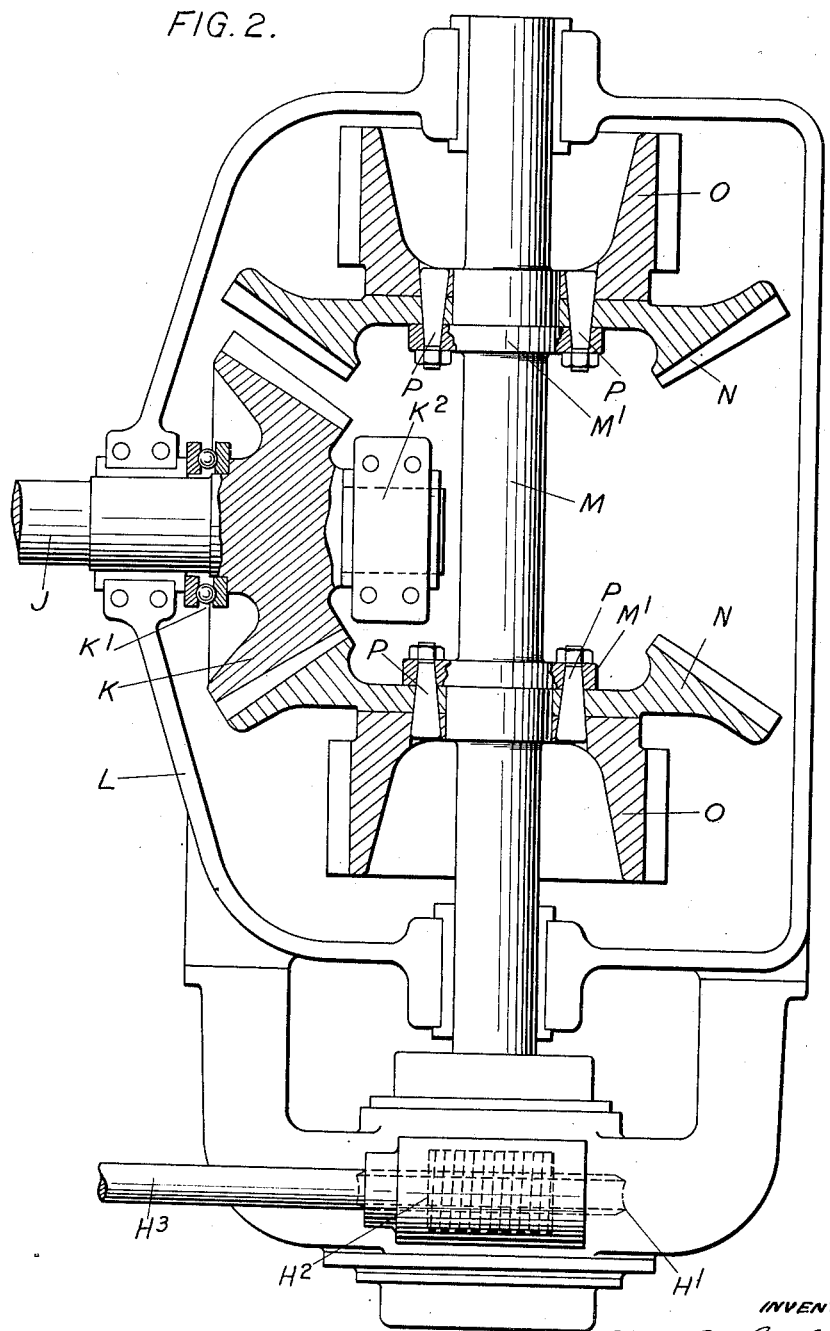
Figure 2 is a sectional elevation showing an alternative method of mounting the wheels on the sliding shaft this view showing also in elevation another portion of the mechanism employed for causing the sliding of the shaft.

The reversing gear illustrated in Figure 1 comprises a driving shaft A on the end of which is mounted a bevel pinion B supported in bearings $C'$ and $C^2$ in a frame C. Mounted at right angles to the shaft A and also supported in bearings in the frame C is a transverse shaft D. This shaft carries two bevel pinions E towards its centre portion and two gear wheels F towards its ends, the bevel pinions and the gear wheels being formed integral with or rigidly connected to the shaft D. The bevel pinions E are spaced at such a distance apart that either one or the other of them can be brought into engagement with the bevel pinion B by moving the shaft D in the direction of its axis, while the gear wheels F are of such width that they will remain in engagement with gear wheels meshing therewith throughout this axial movement of the shaft D. The mechanism for moving the shaft D in the direction of its axis conveniently comprises a sleeve G connected to one end of the shaft D by means of double thrust bearings $G'$ which are held in place on the shaft by means of a nut $G^2$ and within the sleeve by means of a screwthreaded annulus $G^3$ engaging a collar $G^4$ of special shape which retains the outer member of the bearing $G'$ in position. The sleeve G is held against rotation relatively to the frame C by means of a key $G^5$ and is formed on its outer surface with a screwthread $G^6$ which is engaged by a nut member H rotatably mounted within a housing $C^3$ in the frame C while being held against axial movement relatively thereto. The nut member H is formed on its outer surface with a worm wheel $H'$ which is engaged by a worm $H^2$ adapted to be rotated by a shaft $H^3$ as indicated in Figure 2 so as to rotate the nut member H. It will be seen that rotation of the nut member H will move the sleeve G in the axial direction and thus, through the thrust bearings will cause the desired movement of the shaft D. The shaft $H^3$ may be operated either by hand or by power.

In the construction illustrated in Figure 2 the reversing gear comprises a driving shaft J on which is mounted a bevel pinion K carried in bearings $K'$, $K^2$ in a frame L. Also mounted in the frame L and at right angles to the shaft J is a transverse shaft M having two flanges $M'$. To each of the flanges M' are secured a bevel pinion N and a gear wheel O, tapered bolts P serving to secure both the bevel pinion and the gear wheel to the flange. As in the construction illustrated in Figure 1, the bevel pinions are spaced at such a distance apart that either one or the other of them can be brought into mesh with the bevel pinion K by moving the shaft M in the direction of its axis, while the gear wheels O are of such width that they will remain in engagement with gear wheels meshing therewith throughout this axial movement. In this construction it will be seen that the bevel pinions N and the gear wheels O may be formed from different material from the shaft J and may be formed for example from high speed steel. The mechanism for moving the shaft M in the direction of its axis is similar to that illustrated in the present figure and in Figure 1 and described above.

Figure 3 shows diagrammatically the reversing gear illustrated in Figure 1 as it may be disposed in the frame of a locomotive. In this construction Q is the locomotive frame which is supported on track wheels Q' connected by rods Q² and carries an internal combustion engine R. The internal combustion engine R is connected through a shaft R' and a variable speed gear S' to the driving shaft A of the reversing gear, while the gear wheels F of the reversing gear mesh with gear wheels S² mounted on a suitable lay shaft. The gear wheels S² mesh with gear wheels T on a shaft U which carries cranks U' which are connected by rods V to the track wheels Q'.

It will readily be understood that the reversing gear illustrated in Figure 2 may be disposed in the frame of a locomotive in a similar manner to that illustrated in Figure 3 for the reversing gear shown in Figure 1, it only being necessary in this case to dispose the gear wheels S and T nearer to the centre portions of their respective shafts.

It will be seen that, since there are no splines, keys or the like connecting the various bevel pinions to their respective shafts but the shafts and wheels are in effect integral, a reversing gear according to the present invention will be of great strength and will thus be capable of transmitting very heavy loads such as are met with in the transmission mechanism of rail locomotives driven by internal combustion engines.

It is to be understood that the constructional details may be varied without departing from this invention.

What I claim as my invention and desire to secure by Letters Patent is:—

1. In a reversing gear for an internal combustion engine locomotive, the combination of a driving shaft, a bevel pinion fixed on this driving shaft, a shaft disposed at right angles to the driving shaft, two bevel pinions fixed rigidly to this second shaft, these wheels being so positioned that either one or the other of them can be brought into engagement with the bevel pinion on the driving shaft, two gear wheels fixed on the said second shaft respectively towards its ends, other gear wheels meshing with these gear wheels and serving to transmit the drive to the track wheels, bearings in which the said second shaft is carried and in which this shaft can be moved in the direction of its axis so as to cause one or the other of the bevel wheels thereon to engage with the bevel pinion on the driving shaft, a sleeve mounted adjacent to one end of said second shaft so as to be rotatable thereon but not to be axially movable relatively thereto, a screwthread on this sleeve, a second outer sleeve engaging the screwthread on the first sleeve and means for rotating this outer sleeve so as to move the first sleeve and hence the said second shaft to which it is connected in the direction of its axis as set forth.

2. In a reversing gear for an internal combustion engine locomotive, the combination of a driving shaft, a bevel pinion fixed on this driving shaft, a shaft disposed at right angles to the driving shaft, two bevel pinions fixed rigidly to this second shaft, these wheels being so positioned that either one or the other of them can be brought into engagement with the bevel pinion on the driving shaft, two gear wheels fixed on the said second shaft respectively towards its ends, other gear wheels meshing with these gear wheels and serving to transmit the drive to the track wheels, bearings in which the said second shaft is carried and in which this shaft can be moved in the direction of its axis so as to cause one or the other of the bevel wheels thereon to engage with the bevel pinion on the driving shaft, a sleeve mounted adjacent to one end of said second shaft so as to be rotatable thereon but not to be axially movable relatively thereto, a screwthread on this sleeve, a second outer sleeve engaging the screwthread on the first sleeve, a worm wheel on the outer sleeve, a worm engaging with it by means of which the outer sleeve can be rotated so as to move the inner sleeve and hence the said second shaft to which it is connected in the direction of its axis, and means for rotating the worm.

3. In a reversing gear for an internal combustion engine locomotive, the combination of a driving shaft, a bevel pinion fixed on this driving shaft, a shaft disposed at right angles to the driving shaft, two flanges on this second shaft, a bevel pinion and a gear wheel secured to each flange by connecting means which are common to the bevel pinion and to the gear wheel, further gear wheels meshing with the gear wheels on the said second shaft and serving to transmit the drive to the track wheels, each pair of intermeshing gear wheels being of such width that they will remain in mesh throughout the axial movement of the said second shaft, bearings in which the said second shaft is carried and in which this shaft can be moved in the direction of its axis so as to cause one or other of the bevel wheels to engage with the bevel pinion on the driving shaft, a sleeve mounted adjacent to one end of said second shaft so as to be rotatable thereon but not axially movable relatively thereto, a screwthread on this sleeve, a second outer sleeve engaging the screwthread on the first sleeve, a worm wheel on the outer sleeve and a worm engaging with it by means of which the outer sleeve can be rotated so as to move the inner sleeve and hence the said second shaft to which it is connected in the direction of its axis.

In testimony whereof I have signed my name to this specification.

ALAN ERNEST LEOFRIC CHORLTON.